June 27, 1961   I. C. SANDBACK   2,989,895
OPTICAL OBJECTIVE
Filed June 30, 1958
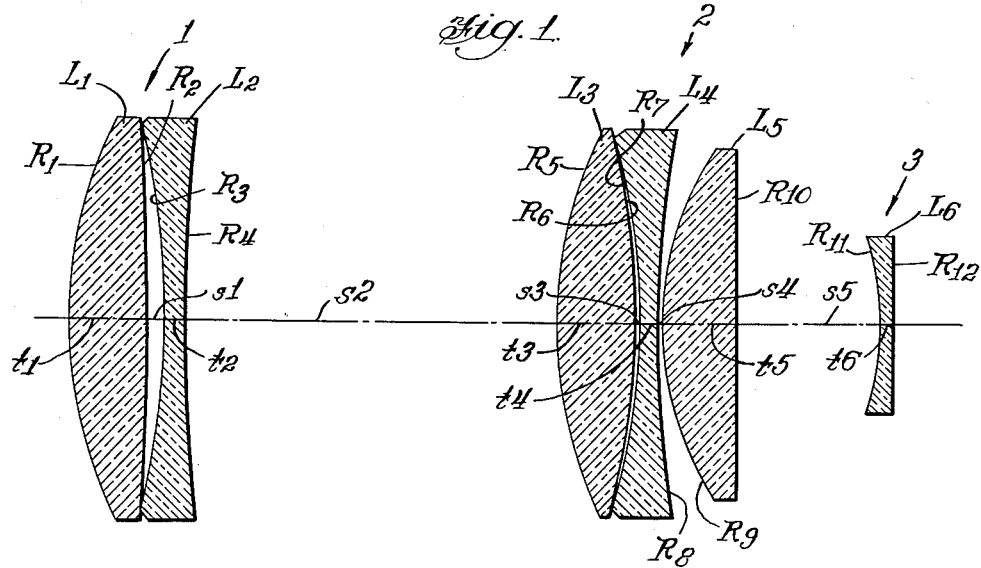
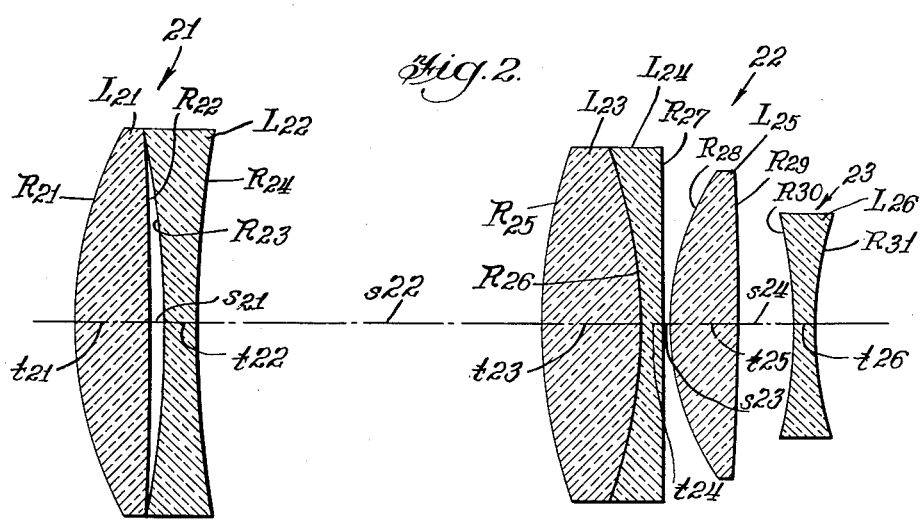
INVENTOR.
Irving C. Sandback
BY Robert F. Mielke, Atty.

United States Patent Office 2,989,895
Patented June 27, 1961

2,989,895
OPTICAL OBJECTIVE

Irving C. Sandback, Morton Grove, Ill., assignor to Bell & Howell Company, Chicago, Ill., a corporation of Illinois
Filed June 30, 1958, Ser. No. 745,746
7 Claims. (Cl. 88—57)

My invention relates to an optical objective, and more particularly to an objective for taking and projecting motion pictures though not limited to such.

High aperture objectives of the Petzval type are limited to a relatively small angular field due to the heavy field curvature inherent to this basic form. A substantial flattening of the field curvature has been attained in the prior art, by using a negative power element, close to the focal plane, thereby imposing extremely short back focus limitations, but reducing astigmatism and field curvature a substantial amount without adversely affecting aberration characteristics of a suitably balanced Petzval objective design. The back focus limitation mentioned above precludes the use of the Petzval with field flattener type of lens design in most motion picture camera or projectors, due to mechanical interference of the rearmost negative power component and the film moving mechanism. To overcome this condition the field flattener element can be displaced towards the basic lens, but as this was done in the past, the spherical aberration and coma correction tended to deteriorate rapidly and due to the strong curvature, higher order effects tended to be introduced as well by this change. It would be desirable to provide an objective having a filed flattener and a long back focal length, and corrected for the aberrations introduced by the field flattener.

Objects of the invention are the provision of a very fast optical objective which is corrected for spherical aberrations including those of the third and higher orders, chromatic aberrations, coma, astigmatism, field curvature and distortion.

Another object of the invention is to provide an objective of high relative aperture with a back focus dimension of .15F or greater, where F denotes the equivalent focal length of the entire objective and in which a relatively large amount of positive power is provided in the components immediately in front of the last negative member so as to keep the incident height of a marginal ray at a minimum when it impinges on this rearmost negative power element, thereby keeping the aberration effects small.

A further object of the invention is to provide an objective having positive front and intermediate components and a rear strong negative field flattener spaced substantially from the focal plane or plane of the film with the intermediate component several times as powerful as the front component so that first and higher order spherical aberrations introduced by the field flattener are effectively cancelled.

It is to be understood that the terms "front" and "rear" as herein used refer to the ends of the objective respectively nearer the longer and shorter conjugates thereof.

In the accompanying drawing forming a part hereof FIGS. 1 and 2 illustrate different objectives embodying the invention.

The invention provides optical objectives primarily intended for projection purposes, but suitable for photographic use, corrected for spherical aberration, chromatic aberration, coma, astigmatism, field curvature, and distortion, comprised of a positive doublet, another positive doublet spaced substantially in back of the first doublet, closely followed by a strong positive singlet, and, spaced a suitable distance to the rear, a strong negative singlet.

Referring to FIG. 1 of the drawings, the objective shown therein comprises first, second and third spherical components 1, 2 and 3. The front component 1 is a doublet shown as an air separated or edge contact type and having lenses $L_1$ and $L_2$. The component 2 has an air separted doublet comprised of lenses $L_3$ and $L_4$ and also has a positive singlet $L_5$. The third component 3 is a field flattener lens $L_6$ which is mounted integrally with the components 1 and 2 and is spaced substantially from the field or film plane to provide space for the mechanism for feeding the film. Rather than the components 1 and 2 being of somewhat equal power, the front component 1 is a weak positive component so that all orders of spherical aberrations and the other aberrations are kept initially low and the second lens component 2 is a very strong positive lens system, being at least several times as strong as the front component. Beginning with the front end of the objective shown in FIG. 1, $R_1$ to $R_{12}$ respectively designate the radii of the optical surfaces of the components, $t_1$ and $t_6$ the axial thicknesses of the components, $s_1$ to $s_5$ the axial separations of the lenses, and $f_1$ to $f_3$ the local lengths of the respective components 1, 2 and 3.

To provide adequate space between the objective and the plane of the film for location of known film moving means (not shown), the back negative lens $L_6$ is also related to the back focal distance of the combined system as follows:

$$.20 < \frac{\text{B.F.L.}}{-K_6} < .30$$

where B.F.L. is defined as the back focal distance of the overall objective and $K_6$ denotes the Petzval power or curvature, contribution of the lens $L_6$ and $K_6$ is further defined by the equation:

$$K_6 = \frac{n-1}{n} \cdot \left(\frac{1}{R_{11}} - \frac{1}{R_{12}}\right)$$

and $n$ denotes the refractive index for the sodium D line of the lens $L_6$ and further $R_{11}$ and $R_{12}$ refer to the first and second radius of curvature of the lens $L_6$ in the normal convention as described previously and represented in FIG. 1.

The higher order spherical aberration is satisfactorily held to a minimum by air spacing the lenses $L_1$ and $L_2$ of front doublet component 1 and maintaining the following ratios:

$$.13F' < \frac{R_3}{R_2} < .45F'$$

$$-.05F' < \frac{R_1}{R_2} < -.25F'$$

$$.20F' < \frac{R_1}{R_4} < .35F'$$

where the signs are used in the customary manner; i.e., a surface to incident rays approaching from the long conjugate side, is called plus, and surface concave to incident rays approaching from the long conjugate side of the objective is designated minus, wherein F' is the number of inches of the equivalent focal length of the objective expressed as an abstract number.

In order to provide good correction, the balance of the objective shown in FIG. 1 must be within the following boundaries, wherein F' is the number of inches of the equivalent focal length of the objective exxpressed as an abstract number:

$$-.15F' < \frac{R_9}{R_{10}} < .25F'$$

$$-.15F' < \frac{R_{11}}{R_{12}} < .15F'$$

Also of importance is the relative distribution of power in the three major components 1, 2 and 3 of the complete objective. In previous lens objectives disclosed in the prior art of allied types of the classical Petzval objective, the relative power contribution of the front doublet has been comparatively strong. The present invention attains satisfactory correction to apertures of $f/1.4$ by purposely keeping the power of component 1 low and that of component 2 high. The transfer of positive power to the component 2 effectively cancels higher order effects introduced by the comparatively strong negative power component 3 and for this purpose, the following relationships are necessary:

$$+3.0F < +f_1 < +4.0F$$
$$+.5F < +f_2 < +.9F$$
$$+.5F < -f_3 < +1.1F$$

where $f_1$ is the focal length of component 1, $f_2$ is the equivalent focal length of the component 2, and $f_3$ is the focal length of the component 3.

In terms of power, the power of the component 1 is from .25 to .33 times that of the overall power of the objective, the combined power of the component 2 is from 1.11 to 2.0 times overall power of the objective and the power of the component 3 is from $-.909$ to $-2.0$ times the overall power of the objective.

Preferred examples of the objective shown in FIG. 1 are made in conformance with the following tables in which dimensions are in terms of inches and in which the indices of refraction for the D line and the Abbe dispersion numbers are respectively indicated at $n_d$ and V:

EXAMPLE 1

[F = Equivalent focal length = 1.000    Back focal length = .150    Aperture $f/1.4$]

[$f_1 = +3.55F$    $f_2 = +.80F$    $f_3 = -1.01F$]

| | | | | |
|---|---|---|---|---|
| $L_1$ | $R_1 = +.7692$ | $t_1 = .140$ | $n_d = 1.611$ | V = 58.8 |
| | $R_2 = -10.000$ | $s_1 = .032$ | | |
| $L_2$ | $R_3 = -1.923$ | $t_2 = .047$ | $n_d = 1.689$ | V = 30.9 |
| | $R_4 = +2.801$ | $s_2 = .600$ | | |
| $L_3$ | $R_5 = +1.250$ | $t_3 = .150$ | $n_d = 1.651$ | V = 55.8 |
| | $R_6 = -.9091$ | $s_2 = .002$ | | |
| $L_4$ | $R_7 = -.8696$ | $t_4 = .040$ | $n_d = 1.689$ | V = 30.9 |
| | $R_8 = +66.66$ | $s_4 = .005$ | | |
| $L_5$ | $R_9 = +.5701$ | $t_5 = .120$ | $n_d = 1.611$ | V = 58.8 |
| | $R_{10} = +2.469$ | $s_5 = .310$ | | |
| $L_6$ | $R_{11} = -.9091$ | $t_6 = .025$ | $n_d = 1.652$ | V = 33.8 |
| | $R_{12} = +2.375$ | | | |

EXAMPLE II

[F = Equivalent focal length = 1.000    Back focal length = .150    Aperture $f/1.4$]

[$f_1 = +3.69F$    $f_2 = +.78F$    $f_3 = -1.03F$]

| | | | | |
|---|---|---|---|---|
| $L_1$ | $R_1 = +.9335$ | $t_1 = .145$ | $n_d = 1.611$ | V = 58.8 |
| | $R_2 = -4.255$ | $s_1 = .024$ | | |
| $L_2$ | $R_3 = -1.835$ | $t_2 = .047$ | $n_d = 1.689$ | V = 30.9 |
| | $R_4 = +3.636$ | $s_2 = .763$ | | |
| $L_3$ | $R_5 = +.841$ | $t_3 = .150$ | $n_d = 1.651$ | V = 55.8 |
| | $R_6 = -1.538$ | $s_3 = .003$ | | |
| $L_4$ | $R_7 = -1.429$ | $t_4 = .040$ | $n_d = 1.689$ | V = 30.9 |
| | $R_8 = +2.000$ | $s_4 = .005$ | | |
| $L_5$ | $R_9 = +.6118$ | $t_5 = .116$ | $n_d = 1.611$ | V = 58.8 |
| | $R_{10} = +18.904$ | $s_5 = .3075$ | | |
| $L_6$ | $R_{11} = -.5882$ | $t_6 = .025$ | $n_d = 1.649$ | V = 33.8 |
| | $R_{12} = -5.000$ | | | |

EXAMPLE III

[F = Equivalent focal length = 1.000    Back focal length = .150    Aperture $f/1.4$]

[$f_1 = +3.71F$    $f_2 = +.74F$    $f_3 = -.83F$]

| | | | | |
|---|---|---|---|---|
| $L_1$ | $R_1 = +.8995$ | $t_1 = .150$ | $n_d = 1.611$ | V = 58.8 |
| | $R_2 = -5.555$ | $s_1 = .028$ | | |
| $L_2$ | $R_3 = -1.786$ | $t_2 = .045$ | $n_d = 1.689$ | V = 30.9 |
| | $R_4 = +3.896$ | $s_2 = .7325$ | | |
| $L_3$ | $R_5 = +.841$ | $t_3 = .150$ | $n_d = 1.651$ | V = 55.8 |
| | $R_6 = -1.5385$ | $s_3 = .003$ | | |
| $L_4$ | $R_7 = -1.429$ | $t_4 = .040$ | $n_d = 1.689$ | V = 30.9 |
| | $R_8 = +2.000$ | $s_4 = .005$ | | |
| $L_5$ | $R_9 = +.5896$ | $t_5 = .147$ | $n_d = 1.611$ | V = 58.8 |
| | $R_{10} = $ Plano | $s_5 = .2775$ | | |
| $L_6$ | $R_{11} = -.5714$ | $t_6 = .025$ | $n_d = 1.689$ | V = 30.9 |
| | $R_{12} = $ Plano | | | |

EXAMPLE IV

[F = Equivalent focal length = 1.000    Back focal length = .282    Aperture $f/1.4$]

[$f_1 = +3.81F$    $f_2 = +.74F$    $f_3 = -.83F$]

| | | | | |
|---|---|---|---|---|
| $L_1$ | $R_1 = +.770$ | $t_1 = .150$ | $n_d = 1.6108$ | V = 58.8 |
| | $R_2 = -12.547$ | $s_1 = .030$ | | |
| $L_2$ | $R_3 = -1.786$ | $t_2 = .060$ | $n_d = 1.649$ | V = 33.8 |
| | $R_4 = +2.304$ | $s_2 = .670$ | | |
| $L_3$ | $R_5 = +1.002$ | $t_3 = .200$ | $n_d = 1.6496$ | V = 55.8 |
| | $R_6 = -1.002$ | $s_3 = .001$ | | |
| $L_4$ | $R_7 = -.991$ | $t_4 = .040$ | $n_d = 1.6885$ | V = 30.9 |
| | $R_8 = $ Plano | $s_4 = .005$ | | |
| $L_5$ | $R_9 = +.5075$ | $t_5 = .150$ | $n_d = 1.620$ | V = 60.0 |
| | $R_{10} = -4.496$ | $s_5 = .105$ | | |
| $L_6$ | $R_{11} = -.9625$ | $t_6 = .037$ | $n_d = 1.673$ | V = 32.2 |
| | $R_{12} = +.701$ | | | |

The objective shown in FIG. 2 and constituting an alternate embodiment of the invention has components 21 to 23, and is similar to the objective shown in FIG. 1 except that second component 22 of the embodiment shown in FIG. 2 has a cemented doublet of lenses $L_{23}$ and $L_{24}$ as distinguished from the corresponding edge contact lenses $L_3$ and $L_4$ of the objective shown in FIG. 1. The objective shown in FIG. 2 has lenses $L_{21}$ to $L_{26}$ with optical surfaces $R_{21}$ to $R_{31}$, thicknesses $t_{21}$ to $t_{26}$ and air spacings $s_{21}$ to $s_{24}$. However, the cemented doublet of lenses $L_{23}$ and $L_{24}$ must be within the following limits, wherein $F'$ is the number of inches of the equivalent focal length of the objective expressed as an abstract number:

$$+.45F' > \frac{R_{25}}{R_{26}} > -.02F'$$

A preferred embodiment of the objective shown in FIG. 2 conforms with the following table in which dimensions are in terms of inches, and in which the indices of refraction for the D line and the Abbe dispersion numbers are respectively designated at $n_d$ and V:

[F=Equivalent focal length=1.000   Back focal length=.282   Aperture f/1.4]

[$f_1$=+3.81F   $f_2$=+.55F   $f_3$=−.60F]

| | | | | |
|---|---|---|---|---|
| $L_{21}$ | $R_{21}$=+.770 | $t_{21}$=.150 | $n_d$=1.6108 | V=58.8 |
| | $R_{22}$=−12.547 | $s_{21}$=.030 | | |
| $L_{22}$ | $R_{23}$=−1.786 | $t_{22}$=.060 | $n_d$=1.649 | V=33.8 |
| | $R_{24}$=+2.304 | $s_{22}$=.670 | | |
| $L_{23}$ | $R_{25}$=+1.002 | $t_{23}$=.200 | $n_d$=1.6496 | V=55.8 |
| $L_{24}$ | $R_{26}$=−1.002 | $t_{24}$=.040 | $n_d$=1.6885 | V=30.9 |
| | $R_{27}$=Plano | $s_{23}$=.005 | | |
| $L_{25}$ | $R_{28}$=+.5048 | $t_{25}$=.150 | $n_d$=1.620 | V=60.0 |
| | $R_{29}$=−5.010 | $s_{24}$=.105 | | |
| $L_{26}$ | $R_{30}$=−.9753 | $t_{26}$=.037 | $n_d$=1.673 | V=32.2 |
| | $R_{31}$=+.701 | | | |

When the objectives described above are to be used for projection purposes, the lenses each are fixed relative to one another as is well known in the art and known adjusting means are used to adjust each objective as a whole relative to the film plane. However, when either of the objectives is used as a camera lens, focusing is achieved by moving the front component 1 or 21 relative to the other components 2 and 3 or 22 and 23 by well known means.

The objective of FIG. 2, for high correction, also must conform to the algebraic inequalities listed above in the description of the objective shown in FIG. 1. Also, when either of the objectives described above is used as a camera objective, a stop may be provided and positioned closely behind the front component 1 or 21. When used as projection lens systems, the lens mount serves as the stop. The objectives are highly corrected for relative apertures even larger than f/1.4.

While the invention is thus described, it is not wished to be limited to the precise details described, as changes may be readily made without departing from the spirit of the invention.

What is claimed is:

1. An optical objective corrected for spherical and chromatic aberrations, coma, astigmatism, field curvatures and distortion comprising a front component, a rear component, and an intermediate group of components having a rear singlet, the front and intermediate components being positive and the front component being substantially less powerful than the intermediate group of components, the rear component being negative, the front component comprising an air separated doublet, the intermediate group of components comprising a doublet and a singlet, and further characterized in that the distribution of power over said components complies with $$.13F' < \frac{R_3}{R_2} < .45F'$$

$$-.05F' < \frac{R_1}{R_2} < -.25F'$$

$$.20F' < \frac{R_1}{R_4} < .35F'$$

$$-.15F' < \frac{R_9}{R_{10}} < +.25F'$$

$$-1.40F' < \frac{R_{11}}{R_{12}} < +.25F'$$

wherein $F'$ is the overall focal length of the objective in inches expressed as an abstract number, $R_1$, $R_2$, $R_3$ and $R_4$ are the respective radii of the surfaces of the front component proceeding from front to rear, $R_9$ and $R_{10}$ are the respective radii of the front and rear optical surfaces of the rear singlet, and $R_{11}$ and $R_{12}$ are the respective radii of the front and rear optical surfaces of the rear component.

2. An optical objective corrected for spherical and chromatic aberrations, coma, astigmatism, field curvatures and distortion comprising a front component, a rear component, and an intermediate group of components, the front component and the intermediate group of components being positive and the front component being substantially less powerful than the intermediate group of components, the rear component being negative, the front component comprising an air separated doublet, the intermediate group of components, comprising a front doublet and a rear singlet, and further characterized in that said objective complies substantially with the following table in which the dimensions are in terms of inches and beginning with the front end of the objective $L_1$ to $L_6$ designate the lenses, $R_1$ to $R_{12}$ the radii of curvature of the optical surfaces, $t_1$ to $t_6$ the axial thicknesses, $s_1$ to $s_5$ the axial separations, $n_d$ the refractive indices for the D line, and V the Abbe dispersion numbers:

[Equivalent focal length=1.000   Back focal length=.150   Aperture f/1.4]

| | | | | |
|---|---|---|---|---|
| $L_1$ | $R_1$=+.7692 | $t_1$=.140 | $n_d$=1.611 | V=58.8 |
| | $R_2$=−10.000 | $s_1$=.032 | | |
| $L_2$ | $R_3$=−1.923 | $t_2$=.047 | $n_d$=1.689 | V=30.9 |
| | $R_4$=+2.801 | $s_2$=.600 | | |
| $L_3$ | $R_5$=+1.250 | $t_3$=.150 | $n_d$=1.651 | V=55.8 |
| | $R_6$=−.9091 | $s_3$=.002 | | |
| $L_4$ | $R_7$=−.8696 | $t_4$=.040 | $n_d$=1.689 | V=30.9 |
| | $R_8$=+66.66 | $s_4$=.005 | | |
| $L_5$ | $R_9$=+.5701 | $t_5$=.120 | $n_d$=1.611 | V=58.8 |
| | $R_{10}$=+2.469 | $s_5$=.310 | | |
| $L_6$ | $R_{11}$=−.9091 | $t_6$=.025 | $n_d$=1.652 | V=33.8 |
| | $R_{12}$=+2.375 | | | |

3. An optical objective corrected for spherical and chromatic abberrations, coma, astigmatism, field curvatures and distortion comprising a front component, a rear component, and an intermediate group of components, the front component and the intermediate group of components being positive and the front component being substantially less powerful than the combined power of the intermediate group of components, the rear component being negative, the front component comprising an air separated doublet, the intermediate group of components comprising a front doublet and a rear singlet, and further characterized in that said objective complies substantially with the following table in which the dimensions are in terms of inches and beginning with the front end of the objective $L_1$ to $L_6$ designate the lenses, $R_1$ to $R_{12}$ the radii of curvature of the optical surfaces, $t_1$ to $t_6$ the axial thicknesses, $s_1$ to $s_5$ the axial separations, $n_d$ the refractive indices for the D line, and V the Abbe dispersion numbers:

[Equivalent focal length=1.000   Back focal length=.150   Aperture f/1.4]

| | | | | |
|---|---|---|---|---|
| $L_1$ | $R_1 = +.9335$ | $t_1 = .145$ | $n_d = 1.611$ | $V = 58.8$ |
| | $R_2 = -4.255$ | $s_1 = .024$ | | |
| $L_2$ | $R_3 = -1.835$ | $t_2 = .047$ | $n_d = 1.689$ | $V = 30.9$ |
| | $R_4 = +3.636$ | $s_2 = .763$ | | |
| $L_3$ | $R_5 = +.841$ | $t_3 = .150$ | $n_d = 1.651$ | $V = 55.8$ |
| | $R_6 = -1.538$ | $s_3 = .003$ | | |
| $L_4$ | $R_7 = -1.429$ | $t_4 = .040$ | $n_d = 1.689$ | $V = 30.9$ |
| | $R_8 = +2.000$ | $s_4 = .005$ | | |
| $L_5$ | $R_9 = +.6118$ | $t_5 = .116$ | $n_d = 1.611$ | $V = 58.8$ |
| | $R_{10} = +18.904$ | $s_5 = .3075$ | | |
| $L_6$ | $R_{11} = -.5882$ | $t_6 = .025$ | $n_d = 1.649$ | $V = 33.8$ |
| | $R_{12} = -5.000$ | | | |

4. An optical objective corrected for spherical and chromatic aberrations, coma, astigmatism, field curvatures and distortion comprising a front component, a rear component, and an intermediate group of components, the front component and the intermediate components being positive and the front component being substantially less powerful than the intermediate group of components, the rear component being negative, the front component comprising an air separated doublet, the intermediate component comprising a front doublet and a rear singlet, and further characterized in that said objective complies substantially with the following table in which the dimensions are in terms of inches and beginning with the front end of the objective $L_1$ to $L_6$ designate the lenses, $R_1$ to $R_{12}$ the radii of curvature of the optical surfaces, $t_1$ to $t_6$ the axial thicknesses, $s_1$ to $s_5$ the axial separations, $n_d$ the refractive indices for the D line, and V the Abbe dispersion numbers:

[Equivalent focal length=1.000   Back focal length=.150   Aperture f/1.4]

| | | | | |
|---|---|---|---|---|
| $L_1$ | $R_1 = +.8995$ | $t_1 = .150$ | $n_d = 1.611$ | $V = 58.8$ |
| | $R_2 = -5.555$ | $s_1 = .028$ | | |
| $L_2$ | $R_3 = -1.786$ | $t_2 = .045$ | $n_d = 1.689$ | $V = 30.9$ |
| | $R_4 = +3.896$ | $s_2 = .7325$ | | |
| $L_3$ | $R_5 = +.841$ | $t_3 = .150$ | $n_d = 1.651$ | $V = 55.8$ |
| | $R_6 = -1.5385$ | $s_3 = .003$ | | |
| $L_4$ | $R_7 = -1.429$ | $t_4 = .040$ | $n_d = 1.689$ | $V = 30.9$ |
| | $R_8 = +2.000$ | $s_4 = .005$ | | |
| $L_5$ | $R_9 = +.5896$ | $t_5 = .147$ | $n_d = 1.611$ | $V = 58.8$ |
| | $R_{10} = $ Plano | $s_5 = .2775$ | | |
| $L_6$ | $R_{11} = -.5744$ | $t_6 = .025$ | $n_d = 1.689$ | $V = 30.9$ |
| | $R_{12} = $ Plano | | | |

5. An optical objective corrected for spherical and chromatic aberrations, coma, astigmatism, field curvatures and distortion comprising a front component, a rear component, and an intermediate group of components, the front component and the intermediate group of components being positive and the front component being substantially less powerful than the intermediate group of components, the rear component being negative, the front component comprising an air separated doublet, the intermediate component comprising a front doublet and a rear singlet, and further characterized in that said objective complies substantially with the following table in which the dimensions are in terms of inches and beginning with the front end of the objective $L_1$ to $L_6$ designate the lenses, $R_1$ to $R_{12}$ the radii of curvature of the optical surfaces, $t_1$ to $t_6$ the axial thicknesses, $s_1$ to $s_5$ the axial separations, $n_d$ the refractive indices for the D line, and V the Abbe dispersion numbers:

[Equivalent focal length=1.000   Back focal length=.282   Aperture f/1.4]

| | | | | |
|---|---|---|---|---|
| $L_1$ | $R_1 = +.770$ | $t_1 = .150$ | $n_d = 1.6108$ | $V = 58.8$ |
| | $R_2 = -12.547$ | $s_1 = .030$ | | |
| $L_2$ | $R_3 = -1.786$ | $t_2 = .060$ | $n_d = 1.649$ | $V = 33.8$ |
| | $R_4 = +2.304$ | $s_2 = .670$ | | |
| $L_3$ | $R_5 = +1.002$ | $t_3 = .200$ | $n_d = 1.6496$ | $V = 55.8$ |
| | $R_6 = -1.002$ | $s_3 = .001$ | | |
| $L_4$ | $R_7 = -.991$ | $t_4 = .040$ | $n_d = 1.6885$ | $V = 30.9$ |
| | $R_8 = $ Plano | $s_4 = .005$ | | |
| $L_5$ | $R_9 = +.5075$ | $t_5 = .150$ | $n_d = 1.620$ | $V = 60.0$ |
| | $R_{10} = -4.496$ | $s_5 = .105$ | | |
| $L_6$ | $R_{11} = -.9625$ | $t_6 = .037$ | $n_d = 1.673$ | $V = 32.2$ |
| | $R_{12} = +.701$ | | | |

6. An optical objective corrected for spherical and chromatic aberrations, coma, astigmatism, field curvatures and distortion comprising a front component, a rear component, and an intermediate group of components, the front component and the intermediate group of components being positive and the front component being substantially less powerful than the intermediate group of components, the rear component being negative, the front component comprising an air separated doublet, the intermediate group of components comprising a front cemented doublet and a rear singlet, and further characterized in that said objective complies substantially with the following table in which the dimensions are in terms of inches and beginning with the front end of the objective $L_{21}$ to $L_{26}$ designate the lenses, $R_{21}$ to $R_{31}$ the radii of curvature of the optical surfaces, $t_{21}$ to $t_{26}$ the axial thicknesses, $s_{21}$ to $s_{24}$ the axial separations, $n_d$ the refractive indices for the D line, and V the Abbe dispersion numbers:

[F=Equivalent focal length=1.000   Back focal length=.282   Aperture f/1.4]

| | | | | |
|---|---|---|---|---|
| $L_{21}$ | $R_{21} = +.770$ | $t_{21} = .150$ | $n_d = 1.6108$ | $V = 58.8$ |
| | $R_{22} = -12.547$ | $s_{21} = .030$ | | |
| $L_{22}$ | $R_{23} = -1.786$ | $t_{22} = .060$ | $n_d = 1.649$ | $V = 33.8$ |
| | $R_{24} = +2.304$ | $s_{22} = .670$ | | |
| $L_{23}$ | $R_{25} = +1.002$ | $t_{23} = .200$ | $n_d = 1.6496$ | $V = 55.8$ |
| | $R_{26} = -1.002$ | | | |
| $L_{24}$ | $R_{27} = $ Plano | $t_{24} = .040$ | $n_d = 1.6885$ | $V = 30.9$ |
| | | $s_{23} = .005$ | | |
| $L_{25}$ | $R_{28} = +.5048$ | $t_{25} = .150$ | $n_d = 1.620$ | $V = 60.0$ |
| | $R_{29} = -5.010$ | $s_{24} = .105$ | | |
| $L_{26}$ | $R_{30} = -.9753$ | $t_{26} = .037$ | $n_d = 1.673$ | $V = 32.2$ |
| | $R_{31} = +.701$ | | | |

7. A corrected objective; which comprises a front air separated rim contact doublet component including a front positive lens and a rear negative lens with the adjacent surfaces so shaped as to correct higher order spherical aberration; intermediate components including an air separated edge contact doublet and a rear positive lens with said front doublet comprising a front positive lens and a rear negative lens; and a rear field flattener component; and in which the front doublet component conforms substantially to the following equations in which $$+.13F' < \frac{R_3}{R_2} < +.45F'$$

$$-.05F' < \frac{R_1}{R_2} < -.25F'$$

$$+.20F' < \frac{R_1}{R_4} < +.35F'$$

$$-.15F' < \frac{R_9}{R_{10}} < .25F'$$

$$-1.40F' < \frac{R_{11}}{R_{12}} < .15F'$$

$$.20 < \frac{\text{Back focal distance of objective}}{-K_6} < .30$$

where dimensions are in inches, $R_1$ to $R_4$ designate the respective radii of the first and second lenses of the doublet component proceeding from front to rear, $F'$ is the overall focal length of the objective in inches expressed as an abstract number, $R_9$ and $R_{10}$ are the respective radii of the front and rear surfaces of the rear positive lens, $R_{11}$ and $R_{12}$ are the respective front and rear surfaces of the rear field flattener component, and $K_6$ is the Petzval power or curvature of the rear component and $$K_6 = \frac{n-1}{n}\left(\frac{1}{R_{11}} - \frac{1}{R_{12}}\right)$$

where $n$ is the refractive index of the rear component for the sodium D line.

References Cited in the file of this patent

UNITED STATES PATENTS

| | | |
|---|---|---|
| 1,996,054 | Bowen | Apr. 2, 1935 |
| 2,076,190 | Wood | Apr. 6, 1937 |
| 2,384,624 | Kingslake et al. | Sept. 11, 1945 |
| 2,604,013 | Schade | July 22, 1952 |
| 2,833,181 | Bertele | May 6, 1958 |

FOREIGN PATENTS

| | | |
|---|---|---|
| 593,514 | Great Britain | Oct. 20, 1947 |
| 673,353 | Great Britain | June 4, 1952 |
| 714,550 | Great Britain | Sept. 1, 1954 |
| 891,469 | Germany | Sept. 28, 1953 |